United States Patent
Takemoto

(10) Patent No.: US 7,947,171 B2
(45) Date of Patent: May 24, 2011

(54) COOLING DEVICE FOR FUEL CELL

(75) Inventor: Shinichiro Takemoto, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1099 days.

(21) Appl. No.: 10/980,235

(22) Filed: Nov. 4, 2004

(65) Prior Publication Data
US 2005/0106433 A1   May 19, 2005

(30) Foreign Application Priority Data

Nov. 13, 2003  (JP) ................................ 2003-383912

(51) Int. Cl.
*B01D 15/04* (2006.01)
*B01D 27/02* (2006.01)

(52) U.S. Cl. .................. 210/167.32; 210/181; 210/232; 210/196; 210/248; 210/282; 210/287; 210/446; 210/251; 210/289; 429/435; 429/436; 429/437

(58) Field of Classification Search .................. None
See application file for complete search history.

(56) References Cited

U.S. PATENT DOCUMENTS

| | | | | |
|---|---|---|---|---|
| 3,507,702 A * | 4/1970 | Sanderson | ...................... | 429/24 |
| 4,120,787 A * | 10/1978 | Yargeau | .......................... | 210/664 |
| 4,344,849 A * | 8/1982 | Grasso et al. | ................. | 210/662 |
| 5,147,736 A * | 9/1992 | Lapp | ............................. | 429/27 |
| 5,200,278 A * | 4/1993 | Watkins et al. | ................. | 429/24 |
| 5,344,721 A * | 9/1994 | Sonai et al. | ..................... | 429/20 |
| 5,980,716 A * | 11/1999 | Horinouchi et al. | .......... | 204/524 |
| 6,207,308 B1 * | 3/2001 | Grasso et al. | ................... | 429/26 |
| 6,406,810 B1 * | 6/2002 | Konrad et al. | .................. | 429/34 |
| 6,692,854 B2 * | 2/2004 | Misumi | ........................... | 429/26 |
| 6,723,460 B2 * | 4/2004 | Derflinger et al. | .............. | 429/13 |
| 6,855,445 B2 * | 2/2005 | Mueller et al. | .................. | 429/26 |
| 7,052,790 B2 * | 5/2006 | Nakamura et al. | ............. | 429/26 |
| 7,083,733 B2 * | 8/2006 | Freydina et al. | ............... | 210/739 |
| 7,097,763 B2 * | 8/2006 | Takemoto et al. | ............. | 210/130 |
| 7,235,319 B2 * | 6/2007 | Kormann et al. | .............. | 429/26 |
| 7,250,230 B2 * | 7/2007 | Fischer et al. | .................. | 429/19 |
| 7,261,816 B2 * | 8/2007 | Suzuki et al. | ................. | 210/282 |
| 7,329,348 B2 * | 2/2008 | Curello et al. | ................ | 210/251 |

(Continued)

FOREIGN PATENT DOCUMENTS

JP          10208764 A  *  8/1998

(Continued)

OTHER PUBLICATIONS

Machine Translations of JP 10-208764 and JP 2003-24924.*

(Continued)

*Primary Examiner* — Robert James Popovics
(74) *Attorney, Agent, or Firm* — McDermott Will & Emery LLP

(57) ABSTRACT

A cartridge-type ion removal filter 15 to remove ions from the cooling liquid in the cooling liquid circulation passage 20 is disposed in the middle of a cooling liquid circulation passage 20 to circulate the cooling liquid between a fuel cell stack 11 and a radiator 12. The ion removal filter 15 is disposed in the cooling liquid circulation passage so that an opening 26*b* of a vessel main body 26 is in a higher position than the highest level "H" of the cooling liquid in the reservoir tank 14.

3 Claims, 3 Drawing Sheets

U.S. PATENT DOCUMENTS

| | | | |
|---|---|---|---|
| 7,635,427 B2* | 12/2009 | Suzuki et al. | 210/282 |
| 2002/0164512 A1* | 11/2002 | Grasso | 429/26 |
| 2003/0085135 A1* | 5/2003 | Andrews et al. | 205/637 |
| 2003/0129465 A1* | 7/2003 | Nakamura et al. | 429/26 |
| 2005/0019627 A1* | 1/2005 | Ozeki et al. | 429/20 |
| 2005/0058868 A1* | 3/2005 | Taga | 429/26 |
| 2005/0106433 A1* | 5/2005 | Takemoto | 429/24 |
| 2005/0115883 A1* | 6/2005 | Takemoto et al. | 210/282 |
| 2005/0115884 A1* | 6/2005 | Suzuki et al. | 210/282 |
| 2005/0274676 A1* | 12/2005 | Kumar et al. | 210/681 |
| 2006/0029851 A1* | 2/2006 | Santiago et al. | 429/30 |
| 2006/0147772 A1* | 7/2006 | Takemoto | 429/24 |
| 2006/0174642 A1* | 8/2006 | Nagashima et al. | 62/259.2 |
| 2006/0174643 A1* | 8/2006 | Ostrom et al. | 62/259.2 |
| 2006/0204806 A1* | 9/2006 | Takada et al. | 429/26 |
| 2007/0020497 A1* | 1/2007 | Ryoichi et al. | 429/32 |
| 2007/0026267 A1* | 2/2007 | Paulus et al. | 429/13 |
| 2007/0119770 A1* | 5/2007 | Suzuki et al. | 210/282 |
| 2007/0297470 A1* | 12/2007 | Kawashima et al. | 372/35 |
| 2008/0138712 A1* | 6/2008 | Suzuki | 429/247 |

FOREIGN PATENT DOCUMENTS

| | | | |
|---|---|---|---|
| JP | 2001-035519 | | 2/2001 |
| JP | 2003-229152 A | | 8/2003 |
| JP | 2003249249 A | * | 9/2003 |
| JP | 2003286006 A | * | 10/2003 |
| JP | 2003331881 A | * | 11/2003 |
| JP | 2004214085 A | * | 7/2004 |
| JP | 2004255372 A | * | 9/2004 |
| JP | 2004311347 A | * | 11/2004 |
| JP | 2005011803 A | * | 1/2005 |
| JP | 2005071709 A | * | 3/2005 |
| JP | 2005085481 A | * | 3/2005 |
| JP | 2005085482 A | * | 3/2005 |
| JP | 2005149842 A | * | 6/2005 |
| JP | 2005161117 A | * | 6/2005 |
| JP | 2005166267 A | * | 6/2005 |
| JP | 2006179198 A | * | 7/2006 |
| JP | 2006228472 A | * | 8/2006 |
| JP | 2006260896 A | * | 9/2006 |
| JP | 2006351469 A | * | 12/2006 |
| JP | 2007144347 A | * | 6/2007 |
| JP | 2007294305 A | * | 11/2007 |
| WO | WO 03/086979 A1 | | 10/2003 |

OTHER PUBLICATIONS

Machine Translation of JPO Office Action of Apr. 13, 2010 for JPO Application No. JP 2003-383912; 3 pages.*

Japanese Office Action issued in Japanese Patent Application No. JP 2003-383912 dated Apr. 13, 2010.

* cited by examiner

COOLING DEVICE FOR FUEL CELL

BACKGROUND OF THE INVENTION

1. Field of the Invention

The present invention relates to a cooling device for a fuel cell which circulates a cooling liquid to a fuel cell stack and in particular, to an improvement of an ion removal filter of the same.

2. The Related Art of the Invention

As shown in Japanese Patent Publication No. 2001-35519 A, there is known a cooling device with a cartridge-type ion removal filter which is disposed in a circulation passage for a cooling liquid in a fuel cell mounted on a movable body (for example, a vehicle). It is preferable that the cooling liquid used in the fuel cell has a low conductivity whereby an electrical current does not flow through the cooling liquid easily. Therefore, conductivity of the cooling liquid is always maintained below a predetermined value due to removing the ions from the cooling liquid through the ion removable filter.

SUMMARY OF THE INVENTION

In the event of replacing a filter cartridge, it is necessary to in advance discharge the cooling liquid from a cooling liquid circulation passage or close passages before and after the ion removal filter to prevent leak of the cooling liquid, which requires a lot of labor for the replacement work.

And an air vent is disposed in the circulation passage to escape an air which is inadvertently introduced therein when replacing the filter cartridge. However, a part of the cooling liquid is flown out through the air vent, possibly causing deterioration of an ion removal effect by the ion removal filter.

An object of the present invention is to provide a cooling device for a fuel cell which enables easy replacement work of a filter cartridge.

Another object of the present invention is to provide a cooling device for a fuel cell which prevents a cooling liquid from flowing over a cooling liquid circulation passage for replacement work of a filter cartridge.

One aspect of the present invention is to provide a cooling device for a fuel cell which comprises a cooling liquid circulation passage to circulate a cooling liquid between a fuel cell stack and a radiator, and an ion removal filter interposed in the cooling liquid circulation passage to remove at least a part of ions in the cooling liquid. The ion removal filter includes a replaceable filter cartridge, a vessel main body having an opening to receive the replaceable filter cartridge therein, and a lid to close the opening of the vessel main body, wherein the ion removal filter is located in the cooling liquid circulation passage so that the opening of the vessel main body is in a higher position than the highest level of the cooling liquid in the cooling liquid circulation passage.

These and other objects, features, aspects and advantages of the present invention will be become apparent to those skilled in the art from the following detailed description, which, taken in conjunction with the annexed drawings, discloses preferred embodiments of the present invention.

BRIEF EXPLANATION OF THE DRAWINGS

Referring now to the attached drawings which form a part of this original disclosure.

DETAILED DESCRIPTION OF THE PREFERRED EMBODIMENT

A selected embodiment of the present invention will now be explained with reference to the drawings.

Figure 1:
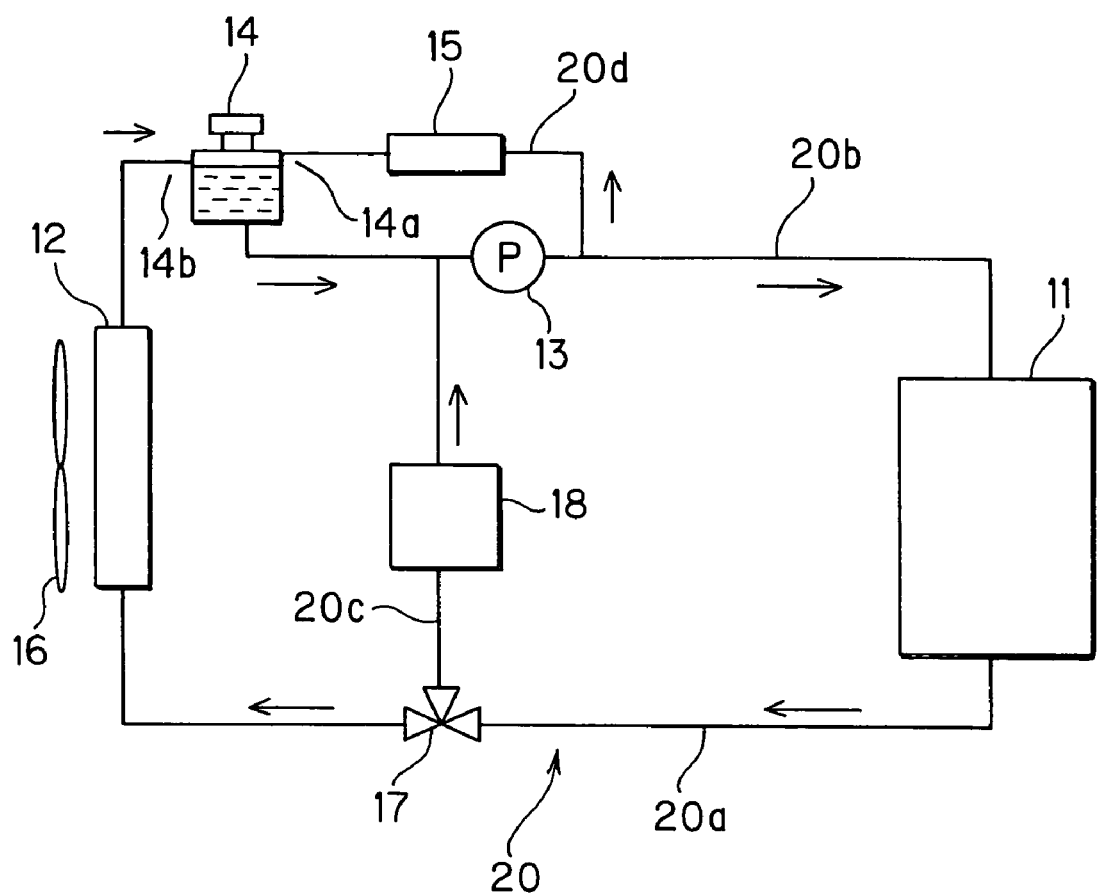
FIG. 1 is a schematic construction view of a cooling system for a fuel cell.

FIG. 1 shows a schematic construction of a cooling system for a fuel cell to which the present invention is applied.

In FIG. 1, a fuel cell stack 11 generates power by supplying oxygen and hydrogen and a cooling liquid circulation passage 20 is disposed where a pure water or ethylene glycol representative of a glycolic antifreezing liquid is circulated as a cooling liquid to cool the fuel cell stack 11 heated in generating the power.

The cooling liquid circulation passage 20 is equipped with a radiator 12 to radiate heat in the cooling liquid, an electrically operated pump 13 to circulate the cooling liquid, a reservoir tank 14 to reserve the cooling liquid, an ion removal filter 15 to remove ions contained in the cooling liquid, a three-way valve 17 to change a flowing path of the cooling liquid in response to a temperature of the cooling liquid, and a heat exchanger 18 to exchange heat with the cooling liquid. Further, an electrically operated cooling fan 16 to promote heat radiation of the radiator 12 is located in front thereof.

The cooling liquid circulation passage 20 includes a first passage 20a to introduce into the radiator 12 the cooling liquid which has cooled the fuel cell stack 11, and a second passage 20b to return the cooling liquid heat of which is radiated in the radiator 12 back to the fuel cell stack 11 where the reservoir tank 14 is interposed in the middle of the second passage 20b in the return side from the radiator 12, and further the electrically operated pump 13 is interposed downstream of the reservoir tank 14 to send out the cooling liquid to the fuel cell stack 11.

A bypass passage 20c is branched off from the middle of the first passage 20a and the bypass passage 20c is communicated with the second passage 20b in a portion between the reservoir tank 14 and the electrically operated pump 13.

A three-way valve 17 is disposed in the branch portion of the bypass passage 20c and the three-way valve 17 directs the cooling liquid discharged from the fuel cell stack 11 to the bypass passage 20c or the radiator 12. The three-way valve 17 is controlled by a controller (not shown) so that the cooling liquid is flown mainly to the radiator 12 for promoting a cooling function when a cooling load in the fuel cell stack 11 is high and on the other hand, when the cooling load of the fuel cell stack 11 is low, the cooling liquid is flown mainly to the bypass passage 20c.

The second passage 20b is equipped with a branch passage 20d to connect a discharge side of the electrically operated pump 13 to the reservoir tank 14, and the ion removal filter 15 is interposed in the middle of the branch passage 20d. Accordingly a first inlet 14a and a second inlet 14b are disposed in the reservoir tank 14 where the cooling liquid from the ion removal filter 15 is introduced through the first inlet 14a therein and the cooling liquid from the radiator 12 is introduced through the second inlet 14b therein.

In such construction, when the cooling load of the fuel cell stack 11 is high accompanying activation of the electrically operated pump 13, the cooling liquid of the fuel cell stack 11 flows via the first passage 20a to the radiator 12, and further to the reservoir tank 14 via the second passage 20b, and then is circulated to the fuel cell stack 11 via the electrically operated pump 13. When the cooling load of the fuel cell stack 11 is low, the cooling liquid of the fuel cell stack 11 flows into the bypass passage 20c and the heat exchanger 18, and bypasses the radiator 12 and the reservoir tank 14 to be returned back to the fuel cell stack 11 through the electrically operated pump 13.

In any of the above cases, since a part of the cooling liquid discharged from the electrically operated pump 13 flows into the reservoir tank 14 via the branch passage 20d and the ion removal filter 15, the ion removal action is secured in the ion removal filter 15 whether the cooling load of the fuel cell stack is low or high.

Conductivity of the cooling liquid gradually increases due to the ions dissolved from a material such as piping forming the fuel cell stack 11 or the cooling liquid circulation passage 20. However, since the ions contained in the cooling liquid are removed by thus flowing the cooling liquid through the ion removal filter 15, the conductivity of the cooling liquid can be maintained at less than a predetermined value. This prevents an electrical current from leaking and flowing through the cooling liquid when the cooling liquid passes through the fuel cell stack 11.

Figure 2:
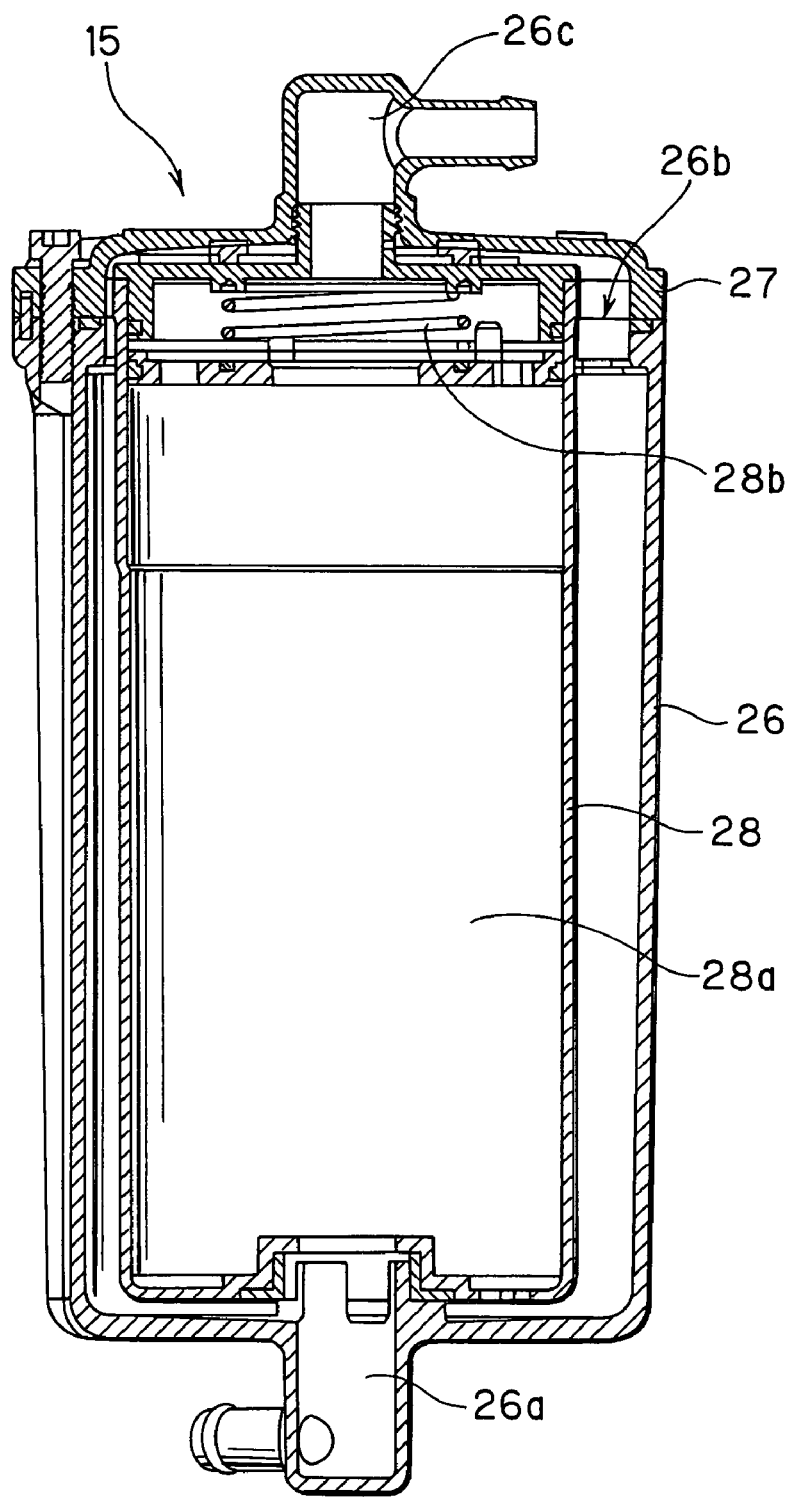
FIG. 2 is a cross sectional view of an ion removal filter.

FIG. 2 shows a detailed structure of the ion removal filter 15.

In FIG. 2, the ion removal filter 15 includes a vessel main body 26, a lid 27, and a filter cartridge 28 received inside the vessel main body 26. The filter cartridge 28 is cylindrical and conductive ions in the cooling liquid are removed during the flowing course of from a point where the cooling liquid flows therein from an inlet in a lower end of the filter cartridge 28 to a point where the cooling liquid flows out from an outlet in an upper end thereof, to control the conductivity of the cooling liquid to be appropriate for cooling the fuel cell stack 11. A cylindrical ion exchange resin 28a is sealed inside the filter cartridge 28, which is received on a cartridge bottom in a pressed state by a spring 28b at a predetermined pressure. This allows flowing and ion exchanging action of the cooling liquid even in case the ion exchange resin 28a inflates or deforms by containing the cooling liquid.

The vessel main body 26 of the ion removal filter 15 is cylindrical with the bottom being closed, and a cooling liquid inlet pipe 26a is disposed in the bottom of the vessel main body 26 to be connected to the cooling liquid inlet of the filter cartridge 28. An top portion of the vessel main body 26 includes an opening 26b to replace the filter cartridge 28 and the opening 26b is tightly closed by a lid 27 fastened to the vessel main body 26 by bolts or the like.

A cooling liquid outlet pipe 26c is disposed in the lid 27 to be connected to a cooling liquid outlet of the filter cartridge 28. The cooling liquid inlet pipe 26a is connected to the second passage 20b of the cooling liquid circulation passage 20 in a discharge side of the electrically operated pump 13 and the cooling liquid outlet pipe 26c is connected to a first inlet 14a of the reservoir tank 14. The outlet pipe 26c may be disposed in the vicinity of the opening 26b of the vessel main body 26, not to the lid 27.

Figure 3:
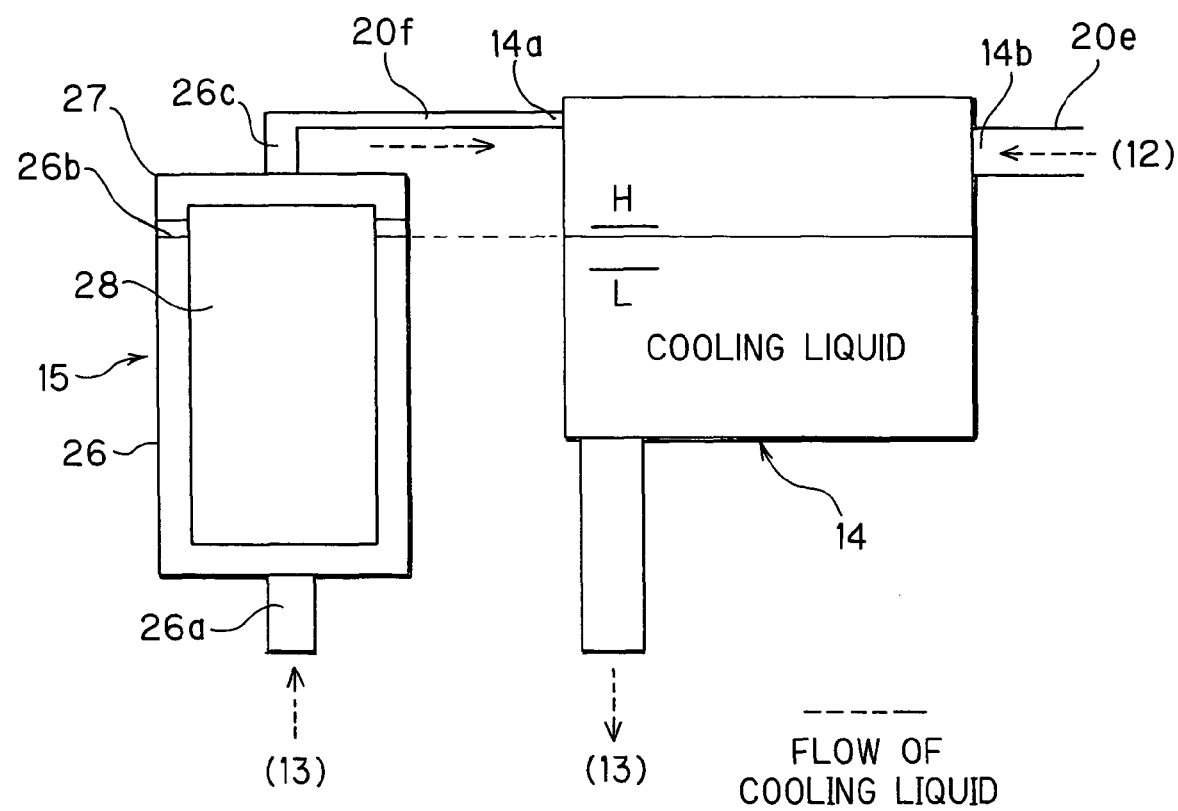
FIG. 3 is an explanation view showing a position relation between the ion removal filter and a reservoir tank.

FIG. 3 shows a position relation between the ion removal filter 15 and the reservoir tank 14. The reservoir tank 14 is generally mounted such that a liquid level of the cooling liquid reserved in the reservoir tank 14 is higher than the highest level of the cooling liquid in a cooling liquid circulation system. A capacity of the tank positioned above an upper limit "H" of the filling liquid level is determined by allowing for inflation of the cooling liquid due to an increasing temperature of the cooling liquid. A lower limit "L" of the liquid level is determined such that when the electrically operated pump 13 is driven and the cooling liquid flows from the bottom of the reservoir tank 14 to the pump 13, even if the liquid level changes, the reservoir tank 14 does not suck an air therein due to a negative pressure from the pump 13. It is to be noted that an air vent (not shown) is disposed in a top of the reservoir tank 14 to communicate a space inside the reservoir tank to an atmosphere.

The ion removal filter 15 is located relative to the reservoir tank 14 so that the opening 26b of the vessel main body 26 is placed at a higher position than the liquid level upper limit "H" of the reservoir tank 14 or at least a same level with the upper limit "H" of the reservoir tank 14. This prevents the cooling liquid from flowing over the opening 26b even if the lid 27 is opened in replacing the filter cartridge 28. Accordingly a cartridge replacement work to take out the filter cartridge 28 inside the vessel main body 26 and replace for a new one is easily performed.

Thus in the earlier technology, the passages in the upper stream side and in the downstream side of the ion removal filter 15 are in advance closed to prevent the cooling liquid from flowing out or the cooling liquid is in advance discharged from the ion removal filter 15, but these troublesome jobs are unnecessary according to the embodiment.

After replacement of the cartridge 28, the lid 27 is fastened to the vessel main body 26 to close the opening 26b. When the electrically operated pump 13 is driven in this state, the cooling liquid supplied from the cooling liquid inlet pipe 26a by a discharge pressure of the pump 13 increases the level of the cooling liquid inside the ion removal filter 15, so that the cooling liquid flows into the reservoir tank 14 through the cooling liquid outlet pipe 26c.

The air left inside the ion removal filter 15 in the cartridge replacement flows out from the upper side of cooling liquid outlet pipe 26c, and is fed out to the reservoir tank 14. Since an air venting hole to be communicated with an atmosphere is disposed in the reservoir tank 14, the air does not remain inside the ion removal filter 15 even without an air vent disposed therein. Since the air does not remain inside the ion removal filter 15, a stable ion removal performance can be maintained without deterioration of ion exchange performance of the filter cartridge 28.

The reservoir tank 14 includes an inlet 14b to receive the cooling liquid from the radiator 12 through the passage 20e, and an inlet 14a to receive the cooling liquid from the ion removal filter 15 through the passage 20f where the inlet 14b is placed in a high position than the inlet 14a. The inlets 14a, 14b both are disposed in a higher position than the usual level of the cooling liquid inside the reservoir tank 14.

Thereby, even in case the filter cartridge is replaced when the level of the cooling liquid in the reservoir 14 is high due to volume inflation by a temperature increase of the cooling liquid immediately after an operation of the fuel cell ends, reverse flow of the cooling liquid of the radiator 12 to the side of the ion removal filter 15 is prevented.

This application claims priority to Japanese Patent Application No. 2003-383912. The entire disclosures of Japanese Patent application No. 2003-383912 (filed on Nov. 13, 2003) is hereby incorporated herein by reference.

While only selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A cooling device for a fuel cell, comprising:
a fuel cell stack heated in generating power by supplying oxygen and hydrogen;
a radiator which radiates heat in a cooling liquid to cool the fuel cell stack;
a cooling liquid circulation passage to circulate the cooling liquid between the fuel cell stack and the radiator;
an ion removal filter interposed in the cooling liquid circulation passage to remove ions in the cooling liquid, wherein the ion removal filter comprises:
a replaceable filter cartridge in which an ion exchange resin is installed;
a vessel main body having an opening to receive the replaceable filter cartridge therein; and
a lid to close the opening of the vessel main body; and
a reservoir tank disposed in the cooling liquid circulation passage to reserve a predetermined amount of the cooling liquid, wherein
the reservoir tank is disposed in the cooling liquid circulation passage so that a level of the cooling liquid inside the reservoir tank corresponds to a highest level of the cooling liquid in the cooling liquid circulation passage, and the opening of the vessel main body is disposed in a higher position than a highest level of the cooling liquid in the reservoir tank, wherein
a cooling liquid inlet pipe, to be connected to the cooling liquid circulation passage, is disposed at a bottom of the vessel main body to be connected to a cooling liquid inlet of the filter cartridge in the ion removal filter, and a cooling liquid outlet pipe, to be connected to the cooling liquid circulation passage, is connected to the lid of the vessel main body to be connected to a cooling liquid outlet of the filter cartridge in the ion removal filter whereby the cooling liquid flown through the cooling liquid inlet pipe into the vessel main body passes through the ion exchange resin in the filter cartridge where a conductivity of the cooling liquid to be maintained at less than a predetermined value and is discharged from the cooling outlet pipe and thereafter, is introduced into the reservoir tank.

2. The cooling device for the fuel cell as defined in claim 1, wherein
a connection position of the cooling liquid outlet pipe of the ion removal filter relative to the lid is higher than the opening of the vessel main body.

3. The cooling device for the fuel cell as defined in claim 1, wherein
the reservoir tank includes a first inlet into which the cooling liquid from the ion removal filter is introduced and a second inlet into which the cooling liquid from the radiator is introduced, wherein
the first inlet and the second inlet both are in a higher position than the highest level of the cooling liquid in the reservoir tank, and the first inlet is disposed in a higher position than the second inlet.

* * * * *